Oct. 10, 1967

B. J. ALDENHOFF 3,346,799

POLYPHASE RECTIFIER CIRCUIT HAVING MEANS
TO VARY THE OUTPUT VOLTAGE

Filed April 7, 1965

TIME →

INVENTOR.
BERNARD J. ALDENHOFF

Oct. 10, 1967

B. J. ALDENHOFF 3,346,799

POLYPHASE RECTIFIER CIRCUIT HAVING MEANS
TO VARY THE OUTPUT VOLTAGE

Filed April 7, 1965

INVENTOR.
BERNARD J. ALDENHOFF

United States Patent Office 3,346,799
Patented Oct. 10, 1967

3,346,799
POLYPHASE RECTIFIER CIRCUIT HAVING MEANS TO VARY THE OUTPUT VOLTAGE
Bernard J. Aldenhoff, Oconomowoc, Wis., assignor, by mesne assignments, to Harnischfeger Corporation, West Milwaukee, Wis., a corporation of Wisconsin
Filed Apr. 7, 1965, Ser. No. 446,210
20 Claims. (Cl. 321—18)

ABSTRACT OF THE DISCLOSURE

A polyphase power supply includes a pair of three phase secondaries which are star connected and electrically displaced to provide a six phase output. The common of the stars are interconnected to each other and to an output lead. Switch means within the secondary windings permits interconnection between a high and a low voltage connection. The outer ends of the individual secondary windings of each secondary are each connected in series with a diode to a common junction to form an output connection lead from that secondary. The lead from the one secondary is connected directly to the corresponding output lead whereas the other is connected thereto by a controlled rectifier.

Additionally, a controlled rectifier may be inserted between the second output connection lead means and the common output lead. Further, one of the windings may be provided with low voltage taps interconnected by series diodes directly to a corresponding output lead.

This invention relates to a direct current power supply and particularly to a polyphase transformer-rectifier unit employing full wave rectification of a polyphase alternating current and a controlled rectifier means to vary the output voltage.

Although the present invention is generally applicable to providing rectified alternating current to a direct current load, it is a highly satisfactory low cost direct current supply for establishing and maintaining direct current arcs for welding and the like. It is therefore particularly described in connection with such an application for illustrative purposes only. For example, the power supply may also be employed to provide an inexpensive voltage regulator.

Direct current arc power supplies have, particularly since the development of solid state rectifying elements, generally employed voltage reducing transformers in combination with solid state rectifying circuits connected to the output of the transformer to provide direct current power. An unusually simplified and lightweight power supply of this variety is shown in the copending application of the applicant and another inventor entitled, Arc Power Supply, which was filed on Apr. 7, 1964, with Ser. No. 357,936 and is assigned to a common assignee with this application. As more fully developed therein, a three phase power supply is connected to the load through a plurality of silicon controlled rectifying elements to permit varying of the output voltage by chopping of the input voltage wave as applied to the arc. However, the system requires a plurality of timing circuits and separate silicon controlled rectifiers, which are relatively expensive components. The present invention is particularly directed to a polyphase transformer-rectifier power supply which provides a relatively wide range of voltage control, generally 59% of the maximum output voltage, but which may use a single silicon controlled rectifier and related timing circuit to control the polyphase output and thereby substantially minimize the cost without reducing the operational characteristics of the supply for arc welding, voltage regulation or other functions requiring a variable output voltage.

Generally, in accordance with the present invention, a pair of three phase secondaries is interconnected in parallel to provide a full wave rectified output with the peaks being of immediately successive half wave pulses separated by 60 electrical degrees. In accordance with the present invention, one half wave section is connected between output leads by a bank of uncontrolled rectifiers to provide a fixed output voltage to the load in accordance with and proportional to the input voltage. The second or control section is similarly formed and interconnected as a half wave rectifier unit by a suitable bank of rectifier elements. However, the half wave rectifier unit is connected into the output circuit in series with a controlled rectifier such as a silicon controlled rectifier whereby the portion of the voltage of the control section which is applied to the output leads in parallel with the first section is controllable. The second section is so arranged and selected such that the peak of the uncontrolled section is always above the valley formed by the intersection of the overlapping waves of the control section. This has been found desirable to insure turning off of the silicon controlled rectifier so that continued control of the circuit may be maintained.

The silicon controlled rectifier may be fired in any suitable manner but preferably includes a timing circuit such as the unijunction transistor pulse generating circuit having its input connected directly in parallel with the silicon controlled rectifier and its output connected to the gate of the controlled rectifier.

The output voltage then can be varied between a minimum voltage corresponding to the maximum output voltage of the uncontrolled section to the maximum output voltage of the controlled section. Thus, as the firing in the controlled section is advanced, the voltage progressively changes from the value of the uncontrolled section to the full output voltage of the controlled section. This range of control is often satisfactory and particularly in welding applications. For example, in a low energy, pulsating arc system, the operating voltage normally varies by a factor of 50% of maximum. Similarly, for D.C. power control for motors and other applications where a direct current line regular is required, such range of control will be highly satisfactory.

Further, with the dual sections, the control section need never carry all of the output current. Consequently, the silicon controlled rectifier can have a lower rating than if the full current must be conducted with a substantial reduction in the cost of the silicon controlled rectifier.

Voltage output ranges may desirably be provided to reduce operation at the limits of the system. The transformer secondaries are then interconnected in star configurations with the respective common or star points interconnected to the corresponding three adjacent windings through a suitable tapped switching means to adjust the portion of the windings operably connected into the circuit. This provides for adjusting the peak output of each section and thereby the output voltage range of the direct current power supply. Switching is done in unloaded conditions and consequently a relatively inexpensive switching mechanism can be provided.

In a modification of the above circuit, the uncontrolled or fixed supply section is wound having its secondary with a higher peak voltage than the valley of the controlled section. The secondary includes low voltage taps having an output less than the adjustable section and this secondary may also include high voltage taps having an output greater than the highest voltage level of the adjustable section. The low voltage taps are connected in circuit to produce a fixed minimum voltage below that of the adjustable section. Additionally, the high voltage taps are connected in circuit through a controlled rectifier unit similar to the first adjustable section to produce a second controllable cascaded voltage. The previously described fixed supply section thus becomes a combined fixed adjustable section to permit an increased output employing a single pair of controlled rectifying elements.

The present invention thus provides a low cost direct current rectifier power supply having a readily adjusted or controlled output voltage.

The drawings furnished herewith disclose the above advantages and features as well as others which will be clear from the following description thereof.

Figure 1:
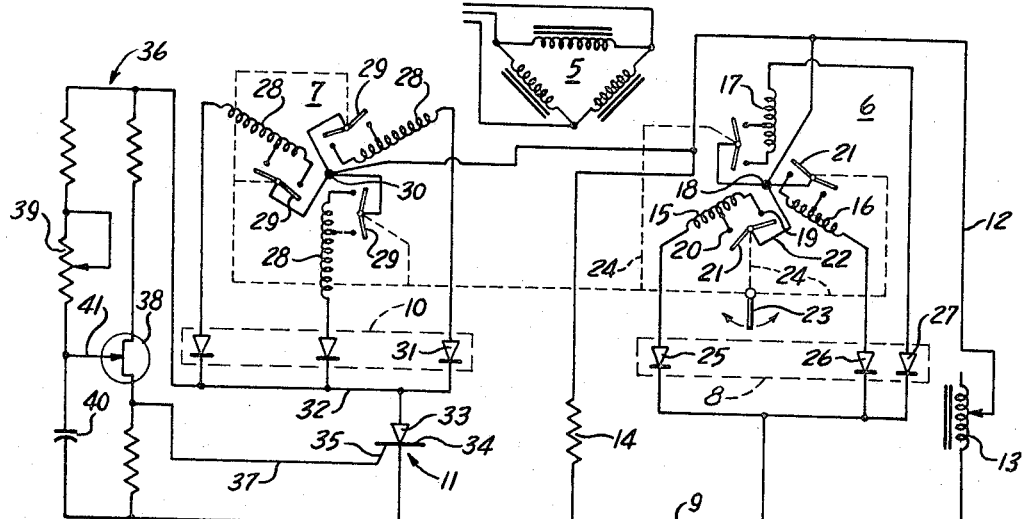
FIG. 1 is a schematic circuit diagram of an arc welding system employing the present invention.

Referring to the drawings and particularly to FIG. 1, the present invention is shown as a part of an arc welding system for illustrative purposes. The arc welding system is shown as a consumable electrode system including a direct current arc 1 which is established between the tip of an electrode 2 and a work member 3. The electrode 2 is diagrammatically illustrated as a consumable electrode which is continuously fed to the arc 1 by a suitable feed means 4. Power to maintain and supply the arc 1 is derived from alternating power distribution lines through a three phase transformer having a delta connected primary 5 magnetically coupled to a pair of star connected secondaries 6 and 7. A first rectifier bank 8 is connected to the output of the secondary 6 and directly to an output lead 9 to provide a fixed rectified voltage supply. A second rectifier bank 10 is connected to the output of the secondary 7 and in series with a silicon controlled rectifier 11 to lead 9 and provides an adjustable output voltage supply in parallel with the fixed voltage supply. The secondaries are also connected to direct current output lead 12 which is connected to the work 3 in series with an adjustable smoothing inductor 13. Inductor 13 is preferably a linear type inductance such as a sliding brush or tap unit or a variable air gap unit and is diagrammatically shown as a sliding brush unit. Additionally, a resistor 14 is connected directly between the output lines 9 and 12 to insure conduction of the silicon controlled rectifier 11 even under open circuit conditions of the arc 1.

The three phase transformer and rectifier banks 8 and 10 produce a full wave rectified or D.C. output voltage at leads 9 and 12 to establish and maintain arc 1 between electrodes 2 and 3. The end of electrode 2 is fed to the arc 1 by the feed means 4 at the burn off rate in accordance with any suitable control, not shown. The output voltage is adjusted between the voltage of secondary 6 and the voltage of secondary 7 by firing of silicon controlled rectifier 11 in accordance with the particular welding process.

The first secondary-rectifier section includes the secondary 6 which has three secondary windings 15, 16 and 17, respectively. Windings 15–17 are magnetically coupled to primary 5 to produce sinusoidal output voltage waves which are angularly displaced by 120 electrical degrees in accordance with known practice. The windings 15–17 are interconnected in a star or Y configuration with the inner ends connected to a star point 18 which in turn is connected to the direct current output lead 12.

In the illustrated embodiment of the invention, each of the windings 15–17 is similarly connected to the star point 18 through a ganged switching mechanism and only the connection of winding 15 will be described in detail.

The winding 15 is provided with an inner end tap 19 and an intermediate tap 20 spaced from the end tap 19. A double-pole switch arm 21 is pivotally mounted between the taps 19 and 20 for selective engagement with either tap 19 or 20. A connecting or coupling lead 22 interconnects the switch arm 21 to the common point 18. Thus, by proper positioning of the switch arm 21, either the complete secondary winding 15 or only a part thereof is operatively and effectively connected into the circuit to point 18.

Windings 16 and 17 are similarly connected into the circuit. The individual switch arms 21 for the several windings are coupled to a common range control arm 23 as shown by the dashed coupling lines 24. The control arm 23 is a pivotally disposed arm for similar rotation of switch arms 21 and positioning of the arms to engage corresponding tap 19 or 20.

The outer or free ends of the windings 15–17 are connected in series with corresponding diodes 25, 26 and 27, respectively, forming rectifier bank 8, directly to the direct current output line 9. In operation, the output of the first rectifying section establishes a fixed direct current output voltage impressed across the electrode 2 and work 3 for establishing and maintaining of the arc 1.

The second rectifying section including secondary 7 provides an adjustable voltage connected in parallel to the voltage of the first rectifying section and constructed to increase the voltage from the minimum supply, as follows.

Generally, the second rectifying section includes the star wound secondary 7 constructed and coupled to primary 5 generally similar to secondary 6. Secondary 7 includes three tapped windings 28 interconnected through a corresponding switching mechanism 29 to a star or common point 30 in the same manner as the star wound secondary 6 and connected to the common control actuator or arm 23 for simultaneous and corresponding positioning. The star point 30 is also connected to the direct current lead 12. The windings 28 of secondary 7 are angularly displaced with respect to the windings 15–17 of secondary 6 to displace the corresponding peaks by 60 electrical degrees and thereby provide a full wave rectified output as presently described.

The secondary 7 differs from the secondary 6 however in that the windings 28 are wound to produce a substantially greater voltage output than the corresponding windings 15–17 of secondary 6. Generally, a highly satisfactory welding supply is formed with secondary 7 having a peak output voltage twice the peak of the secondary 6. Thus, each of the secondary windings 28 can be wound with twice the number of turns of the corresponding windings 15–17 of the secondary 6.

Rectifier bank 10 corresponds to bank 8 and each of the windings 28 is connected in series with a diode 31 to a common coupling or intermediate line 32. The diodes 31 are all polarized in the same direction to conduct from the windings 28 to the common coupling line 32 and thus conduct with respect to the output lead 12 in the same direction as the diodes 25–27 of bank. 8.

In accordance with the present invention, the silicon controlled rectifier 11 interconnects the common line 32 to the direct current output lead 9 which is connected to the electrode 2. The silicon controlled rectifier 11 is a known device and includes an anode 33 connected to line 32, a cathode 34 which is connected to line 9 and a gate 35 which can initiate conduction through the silicon rectifier 11 whenever the anode 33 is positive with respect to the cathode 34. The controlled rectifying section applies an output voltage across the arc 1 only when the silicon controlled rectifier 11 has been fired and then only that portion of the wave following the firing of the rectifier.

In the illustrated embodiment of the invention, a timing circuit 36 is connected between lines 32 and 9 to derive rectified power from the secondary 7 when rectifier 11 is in blocking condition and generates a triggering pulse which is applied via an output lead 37 to the gate 35. The illustrated timing circuit 36 is a known trigger or pulse generating circuit of the type including a unijunction transistor 38 connected between the lines 32 and 9 in parallel with a variable resistor or potentiometer 39 in series with a timing capacitor 40. A trigger lead 41 connects the junction of the potentiometer 39 and capacitor 40 to the unijunction transistor 38. When the capacitor 40 is charged to a predetermined voltage, the transistor 38 changes from a high resistance state to a low resistance state and the capacitor discharges through the gate-cathode path of rectifier 11 to fire it. The setting of the potentiometer 39 determines the time the firing pulse is formed and may be selected to fire the rectifier 11 progressively during each of the half pulses generated by the three windings 28 of the secondary 7 by progressively decreasing the resistance of potentiometer 39. The potentiometer 39 may be a small unit which is readily controlled and which may conveniently be mounted for remote control; for example, on a welding hand gun such as shown in U.S. Patent 2,903,567 to J. Piekarski, et al.

The timing circuit 36 directly derives its power from the direct current output of the adjustable section as a result of the connection between lines 32 and 9 and avoids the necessity for any additional control transformers or the like although such can be provided, if desired.

Figure 2:
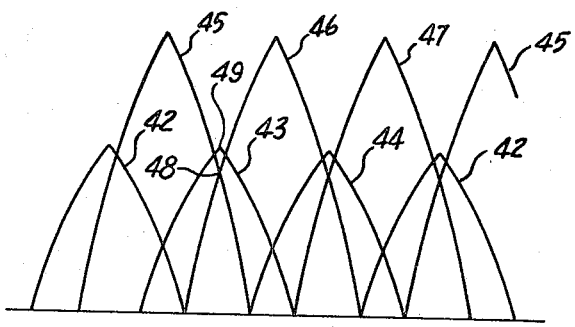
FIG. 2 is a typical graphical illustration of the output rectified peaks or pulses of the circuit shown in FIG. 1.

Referring particularly to FIG. 2, the traces of the rectified positive half cycle of the voltage waves of the secondaries 6 and 7 are typically shown as half wave sine pulses. The pulses of secondary 6 are shown as three similar positive sine wave pulses 42, 43 and 44, overlapping by 120° as a result of the three phase output winding. The output wave pulses of the secondary 7 are shown as three similar pulses 45, 46 and 47 similarly arranged with respect to each other and displaced from the corresponding waves 42, 43 and 44 by 60 electrical degrees.

The output pulses 45–47 of the secondary 7 have a peak amplitude generally twice the peak of the pulses 42–44 of secondary 6. If the silicon controlled rectifier 11 is not fired the pulses 45–47 will not appear between leads 9 and 12. The output voltage is thus determined by the pulses 42–44, inclusive. This establishes a minimum voltage output.

As the silicon controlled rectifier 11 is progressively fired to apply portions of the voltage pulses 45–47, inclusive, each of which will be similarly applied, the voltage progressively increases from the minimum voltage established by pulses 42–44, inclusive, to the maximum provided by the voltage of pulses 45–47. The maximum voltage of course is that due to the secondary 7 as a result of the paralleled connection.

Of particular significance is the intersection of the adjacent pulses 45–47 of secondary 7 which define a valley or intersection point 48 aligned with the peaks 49 of the interpositioned pulses 42–44, inclusive. Each peak 49 is held above the corresponding valley point 48 in order to insure that the silicon controlled rectifier 11 will turn off. Thus, the highest peak of the fixed voltage section back biases the rectifier 11 and reduces the current through the controlled section to zero and thus allows the silicon controlled rectifier 11 to return to the blocking state. Generally, for a 60 cycle power supply, if the regulated or adjustable secondary 7 is wound to produce a peak value equal to or greater than twice the value of the fixed secondary 6, the valley points 48 will move above the peak points 49 and prevent turnoff of the silicon controlled rectifier 11 with a resultant possible loss of control.

Figure 3:
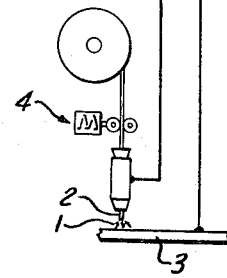
FIG. 3 is a series of traces showing the actual operation of an arc welding system having a direct current power supply as shown in FIG. 1 and energizing a resistance load.
Figure 3:
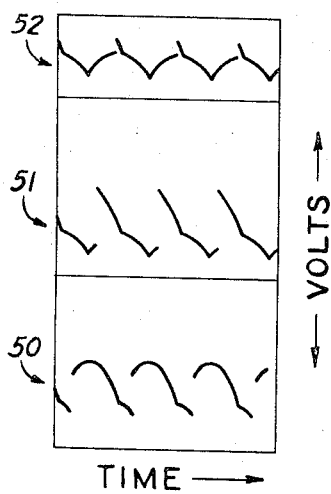

FIG. 3 shows three output voltage traces for a circuit similar to that of FIG. 1, including a maximum voltage trace 50, an intermediate voltage trace 51 and a minimum voltage trace 52.

The maximum voltage corresponds to firing of the rectifier 11 immediately after the voltage wave applied to the anode 33 is increasing in a positive direction. In the maximum voltage trace, it is seen that the output voltage is displaced from the zero voltage axis wave with the output waves substantially consisting of successive upper or top portions of the peaks of the voltage wave of the secondary 7 with the slight portion above the valley points 48 of FIG. 2 filled by the voltage peaks of the fixed voltage supply.

As the timing circuit 36 is adjusted to delay the firing signal, more and more, the gap between the voltage wave of secondary 7 increases and a greater proportion of the fixed voltage supply of secondary 6 appears to fill the gaps between the half wave pulses as shown by trace 51. The minimum voltage trace 52 is obtained at which time rectifier 11 is essentially completely off and only the voltage wave of secondary 6 appears across leads 9 and 12.

The full wave arc power supply as shown in FIG. 1 has been constructed to provide an adjustable output voltage between sixteen and one-half volts and thirty-one volts output; showing essentially a voltage change of 50% of the maximum.

Although the circuit is particularly employed satisfactorily as a low cost supply for low energy, pulsating arc welding and the like, it will also provide a similarly low cost voltage regulation means and the like.

Figure 4:
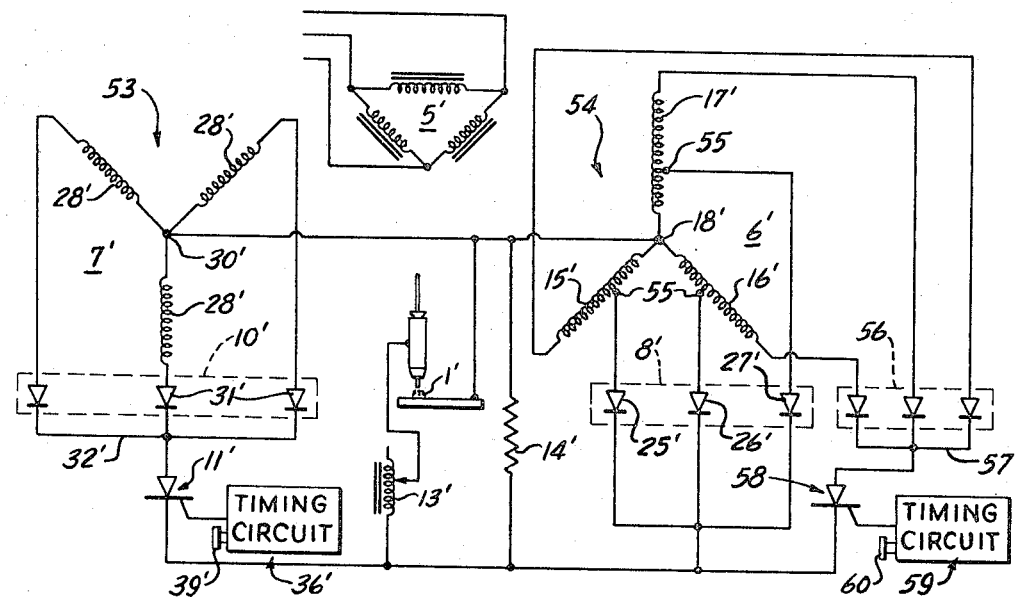
FIG. 4 illustrates an alternative circuit wherein a cascaded voltage control is provided.
Figure 5:
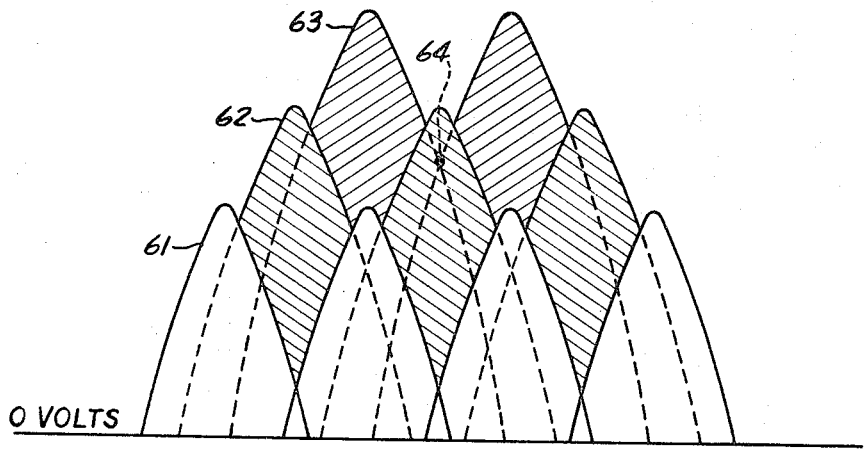
FIG. 5 is a graphical illustration similar to FIG. 2 for the circuit of FIG. 4.

An alternative embodiment of the invention illustrating cascading of rectifying output sections to further increase the output voltage is shown in FIG. 4 with the several output waves of the several sections typically shown in FIG. 5.

Referring particularly to FIG. 4, the modified embodiment of the invention is generally similar to FIG. 1 and includes a first variable voltage section 53 including a secondary 7' connected in parallel with a second fixed-adjustable section 54 including a secondary 6'. As the embodiments generally employ similar paralleled sections, corresponding elements in the embodiments of FIGS. 1 and 4 will be correspondingly numbered for simplicity and clarity of explanation, with the circuit modifications and additions presently described.

In the embodiment of FIG. 4, the switching mechanism for varying the voltage range has been eliminated for simplicity of illustration and the star points 18' and 30' of the windings of secondaries 6' and 7' shown with a fixed star or common connection. If desired, the circuit of FIG. 4 may be modified to include the switching mechanism of FIG. 1.

Additonally, in the embodiment of FIG. 4, the secondary windings 15'–17' of section 54 are wound to have a greater number of turns and therefore a greater peak output with respect to the secondaries of the adjustable section 53. However, in section 54, the connection to the fixed uncontrolled diodes 25'–27' are connected to corresponding intermediate taps 55 on windings 15', 16' and 17' respectively such that the portion between taps 55 and the star point 18' provides a fixed voltage output which is a proportion of the peak output voltage of the adjustable section 53 and preferably slightly in excess of one-half of the peak output voltage of section 53.

Additionally, in FIG. 4, a second adjustable voltage output is provided by connection of diodes 56 between the outer ends of the windings 15' through 17' and a common coupling line 57, similar to the connection of the secondary 7' of section 53 by the bank of diode rectifiers 31' to the line 32'. A silicon controlled rectifier 58 interconnects line 57 to the output line 9' to thus connect the output of the adjustable portion of section 54 in parallel with the fixed portion of section 54 and the adjustable section 53.

A timing circuit 59, corresponding generally to timing circuit 36, is interconnected to control the firing of the silicon controlled rectifier 58. Circuit 59 includes an adjustable potentiometer 60 which generally corresponds to the potentiometer 39 in FIG. 1 but which is wound with twice the resistance value of the potentiometer 39. The taps of the potentiometers 39 and 60 are ganged to provide for simultaneous and similar positioning.

In operation, the output pulses would generally be as shown in FIG. 5 with respect to a zero reference voltage. The fixed portion of section 54 provides a series of pulses 61 generally corresponding to the half wave pulses 42 through 44, inclusive, of FIG. 2. The adjustable section 53 provides a series of higher voltage pulses 62 corresponding generally to pulses 45 through 47, inclusive, of FIG. 2 and similarly superimposed on the pulses 61 in the same manner previously described with respect to FIG. 1.

Additionally, a series of pulses 63 which are in phase with pulses 61 but of a substantially greater amplitude than either pulses 61 or 62 may be superimposed thereon by selective controlled firing of the silicon controlled rectifier 58. The pulses 63 bridge the gap between the pulses 62 and function with respect thereto in the same manner as when pulses 62 are superimposed upon pulses 61. As in the embodiment of FIG. 1, the valley points 64 of pulses 63 should fall below the peak of the pulses 62 to insure turnoff of the silicon controlled rectifier 58.

Thus, in operation, the output voltage of the transformer rectifying power supply of this invention can be cascaded to provide an adjustable output voltage of increasing magnitude by cascading of the transformer secondaries of the several sections with the paralleled sections interconnected to the power lines or the main line through a single silicon controlled rectifier.

Although the range control employs switching in the secondary circuit, a similar result may be obtained by switching in the primary circuit to provide the desired modification of the turns ratio.

The present invention thus provides a relatively inexpensive silicon controlled direct current power supply which is particularly suited for short circuit arc welding and the like but which may also be applied to other electrical controls particularly where a direct current regulated power supply is desired.

Various modes of carrying out the invention are contemplated as being within the scope of the following claims particularly pointing out and distinctly claiming the subject matter which is regarded as the invention.

I claim:

1. In a direct current power source,
 a first polyphase transformer secondary,
 a bank of rectifiers connected to the transformer secondary and interconnected to a common output means providing a half wave rectified output,
 a second polyphase transformer secondary,
 a second bank of rectifiers connected to the second transformer secondary and defining second output means providing a second half wave rectified output,
 output connecting means,
 circuit means connecting the common output means and the second output means in parallel to the output connecting means and having at least one controlled rectifier means connected between said common output means and the connecting means, and
 means connected to the controlled rectifier means to control firing of the controlled rectifier means to conduction.

2. In a direct current power source,
 a first polyphase transformer secondary,
 a bank of rectifiers connected to the transformer secondary and interconnecting to a common output means providing a half wave rectified output,
 a second polyphase transformer secondary,
 a second bank of rectifiers connected to the second transformer secondary and defining second output means providing a second half wave rectified output,
 output connecting means,
 circuit means connecting the common output means and the second output means in parallel to the output connecting means and having at least one controlled rectifier means connected between said common output means and the connecting means, and
 a timing means for controlling the firing of the controlled rectifier means to conduction and including an input connected in parallel with the controlled rectifier means.

3. The direct current power source of claim 2 wherein the controlled rectifier means includes a trigger electrode and said timing means includes a resistor and a capacitor defining a time constant circuit connected in parallel with the controlled rectifiers, and a trigger circuit connects the capacitor to the trigger electrode to periodically fire the rectifier means.

4. In a direct current power source,
 a first polyphase transformer secondary,
 a bank of rectifiers connected to the transformer secondary and defining a first output means providing a half wave rectified output,
 a second polyphase transformer secondary having a peak output substantially greater than the first polyphase transformer,
 a second bank of rectifiers connected to the second transformer secondary and interconnected to a common output means providing a second half wave rectified output,
 output connecting means,
 circuit means connecting the first output means and the common output means in parallel to the output connecting means and having a controlled rectifier means connected between said output means of the second polyphase transformer secondary and the connecting means, and
 means connected to the controlled rectifier means to control firing of the controlled rectifier means to conduction.

5. In a direct current power source,
 a first polyphase transformer secondary,
 a bank of rectifiers connected to the transformer secondary and defining a first output means providing a half wave rectified output,
 a second polyphase transformer secondary having a peak output substantially greater than the first polyphase transformer secondary,
 a second bank of rectifiers connected to the second transformer secondary and defining second output means providing a second half wave rectified output, said second bank of rectifiers being connected to provide a peak output voltage substantially less than said first bank of rectifiers,
 a third bank of rectifiers connected to the second transformer secondary and defining third output means providing a third half wave rectified output, said third bank of rectifiers being connected to provide a peak output voltage substantially greater than said first bank of rectifiers,
 output connecting means, and
 circuit means connecting said first, second and third output means in parallel to each other to the output connecting means and including a first controlled rectifier in series with the first output means and a second controlled rectifier in series with the third output means.

6. A direct current power source, comprising
 a pair of output terminals,
 a polyphase transformer secondary having windings connected at one end to a first of the output terminals,
 rectifier means connected to the opposite ends of the secondary windings and to a common lead to form a common terminal, and a controlled rectifier means connected between the common lead and the second of the output terminals and including means to selectively control the firing of the controlled rectifier means and the portion of the voltage wave between said output terminals, 7. The power source of claim 6 having,
a second pair of output terminals connected in parallel with the first named output terminals,
a second polyphase transformer secondary having windings interconnected at one end to a first of the second output terminals,
rectifier means connected to the opposite end of the second secondary windings to form a common terminal connected to the second of the second pair of output terminals, 8. The power source of claim 6 having,
a second pair of output terminals connected in parallel with the first named output terminals,
a second polyphase transformer secondary having windings interconnected at one end to a first of the second output terminals, said windings of the second secondary having a substantially greater number of turns than said first named secondary,
second rectifier means connected to intermediate turns of the windings of the second secondary to form a second common terminal connected to the second of the second pair of output terminals,
third rectifier means connected to turns of the windings of the second secondary to form a third common terminal, and
a second controlled rectifier means connected between the third common terminal and the second of the second pair of output terminals and including means to selectively control the firing of the second controlled rectifier means.

9. A direct current power source, comprising
a three phase transformer secondary winding connected in a Y configuration with a common output terminal,
a pair of output leads, the first of which is connected to the common output terminal,
a bank of rectifiers connecting the opposite ends of the secondary to a common lead, and
a silicon controlled rectifier connected between the common lead and the second output lead and including means to selectively control the firing of the rectifier and the portion of the voltage wave impressed upon said output leads.

10. A direct current power source, comprising
three phase transformer secondary windings connected in a Y configuration with a common output terminal,
a pair of output leads, the first of which is connected to the common output terminal,
tap means connected to an intermediate point of each winding,
a bank of diode rectifiers connecting the tap means to the second output,
a bank of diode rectifiers connecting the outer ends of the windings to a common lead, and
a silicon controlled rectifier connected between the common lead and the second output lead and including means to selectively control the firing of the rectifier and the portion of the voltage wave impressed upon said output leads.

11. A direct current power source, comprising
a three phase transformer having a first star connected secondary winding section and a second star connected secondary winding section and having a common primary winding, each secondary winding section including three equicircumferentially displaced windings having a common point and having the sections displaced to provide outputs displaced by sixty electrical degrees,
an output line connected to both said common points,
three rectifying diodes connected one each to each of the windings in the first star section,
a second output line connected to the opposite side of the rectifying diodes,
three rectifying diodes connected one each to each of the windings in the second star section,
a common line connecting the opposite side of said last named three rectifying diodes to each other,
a controlled rectifier having its main electrodes connected to the common line and the second output line and having a control gate, and
a self-cycling timing circuit connected between the second output line and the common line and having an output connected to the control gate.

12. The direct current power source of claim 11 having each of the windings of the secondary winding sections being connected to the corresponding common point by a tap switch means to vary the output voltage range.

13. A direct current power supply, comprising
a polyphase star-connected transformer secondary having a plurality of similar windings each of which includes at least a pair of spaced taps,
a common transformer secondary terminal,
a switch means selectively connecting corresponding taps together to the common transformer secondary terminal,
a pair of output leads, a first of which is connected to said terminal,
a plurality of diode rectifiers connected one each to each of the windings and similarly polarized with respect to the common terminal,
a coupling lead connected to said rectifiers,
a controlled rectifier connected to the coupling lead and to the second of the output leads, said controlled rectifier being polarized in the same direction as said diode rectifier and having a control gate,
a timing circuit having an input connected to the coupling lead and the second output lead and having an output connected to the control gate, said timing circuit generating a series of pulses having an adjustable repetition rate whereby the firing of the controlled rectifier is adjustable to vary the portion of the corresponding polyphase voltage wave applied to the output leads,
a second polyphase star-connected transformer secondary having a similar plurality of windings each having no more than one-half the minimum number of effective turns of said first named transformer secondary and arranged to provide a polyphase output displaced by one-half the phase difference between corresponding waves of each secondary, and
a plurality of diode rectifiers connecting said windings of said second transformer to said second output lead.

14. A direct current power supply, comprising
a three phase star-connected transformer secondary having three similar windings each of which includes at least a pair of spaced taps,
a switch means selectively connecting corresponding taps together to a common transformer secondary terminal,
a pair of output leads, a first of which is connected to said terminal,
a plurality of diode rectifiers connected one each to each of the windings and similarly polarized with respect to the common terminal,
a coupling lead connected to said diode rectifiers,
a controlled rectifier connected to the coupling lead and to the second of the output leads, said controlled rectifier being polarized in the same direction as said diode rectifier and having a control gate,
a timing circuit having an input for connection to a source of direct current power and having an output connected to the control gate, said timing circuit generating a series of pulses having an adjustable repetition rate whereby the firing of the controlled rectifier is adjustable to vary the portion of the corresponding three phase voltage wave applied to the output leads, a second three phase star connected transformer secondary having three similar windings having no more than one-half the minimum number of effective turns of said first named transformer secondary and arranged to provide a three phase output displaced by sixty degrees from said first named transformer secondary, and a plurality of diode rectifiers connecting said windings of said second transformer to said second output lead.

15. The direct current power supply of claim 14 wherein said timing circuit is connected to the coupling lead and to said second output lead and thereby deriving power from the corresponding secondary with the controlled rectifier in blocking condition.

16. The direct current power supply of claim 15 having a stabilizing inductor serially connected in one of said output leads.

17. A direct current power supply, comprising a three phase star connected transformer secondary having three similar windings connected at a corresponding joint to a common transformer secondary terminal, a pair of output leads, a first of which is connected to said terminal, a plurality of diode rectifiers connected one each to the windings and similarly polarized with respect to the first output lead, a coupling lead connected to said rectifiers, a controlled rectifier connected to the coupling lead and to the second of the output leads, said controlled rectifier being polarized in the same direction as said diode rectifier and having a control gate, a timing circuit having an input for connection to a power source and having an output connected to the control gate, said timing circuit generating a series of pulses having an adjustable repetition rate whereby the firing of the controlled rectifier is adjustable to vary the portion of the corresponding three phase voltage wave applied to the output leads, a second three phase star-connected transformer secondary three similar windings connected at a corresponding point to a common transformer secondary connected to the first of the output leads and each having a greater number of turns than the corresponding windings of said first named transformer secondary and arranged to provide a three phase output displaced by sixty degrees from the first named transformer secondary, corresponding high voltage tap means and low voltage tap means on each of the windings of the second transformer secondary, said high voltage tap means having a higher peak voltage than said first named transformer secondary and said low voltage tap means having a lower peak voltage than said first named transformer secondary, a plurality of diode rectifiers connecting the low voltage tap means of said windings to said second output lead and polarized in the same direction as the first named diode rectifiers, a plurality of diode rectifiers connected to the high voltage tap means of said windings and polarized in the same direction as the first named diode rectifiers, a second coupling lead connected to said last named plurality of diode rectifiers, a second controlled rectifier connected to the second coupling leads and to the second of the output leads, said controlled rectifier being polarized in the same direction as said first named diode rectifiers and having a control gate, and a timing circuit having an input for connection to a power source and having an output connected to the control gate of the second controlled rectifier, said timing circuit generating a series of pulses having an adjustable repetition rate whereby the firing of the second controlled rectifier is adjustable to vary the portion of the corresponding three phase voltage wave applied to the output leads.

18. A direct current power source, comprising a three phase transformer having a first star-connected winding section having a selected peak output voltage and a second star-connected winding section having a different selected peak output voltage, each section including three equicircumferentially displaced windings having a common point and having the sections being operatively displaced by sixty electrical degrees, an output line connected to both said common points, a second output line, three diodes connected one each to each of the windings in the first star section, a first common line connected in common to the opposite side of the diodes, a silicon controlled rectifier having its main electrodes connected to the common line and the second output line, three diodes connected one each to each of the windings in the second star sections, a second common line connecting the opposite side of said last named three diodes to each other, a silicon controlled rectifier having its main electrodes connected to the second common line and the second output line and having a control gate, and a self-cycling timing circuit means connected to the control gates to selectively fire the silicon controlled rectifiers.

19. In a direct current power source for establishing and maintaining an arc, a first polyphase transformer secondary, a bank of rectifiers connected to the transformer secondary and defining a first output means providing a half wave rectified output, a second polyphase transformer secondary, a second bank of rectifiers connected to the second transformer secondary and defining second output means providing a second half wave rectified output, output connecting means, circuit means connecting the first output means and the second output means in parallel to the output connecting means and having at least one controlled rectifier means connected between one of said output means and the connecting means, means connected to the controlled rectifier means to control firing of the controlled rectifier means to conduction, and a linear inductor means connected in the output connecting means.

20. The power source of claim 19 wherein the linear inductor means includes a winding and means to change the number of turns of the winding connected in the circuit.

References Cited

UNITED STATES PATENTS

| | | | |
|---|---|---|---|
| 2,905,882 | 9/1959 | Koppelmann | 321—27 |
| 2,985,692 | 5/1961 | Fischer | 321—40 |
| 3,113,259 | 12/1963 | Walker | 321—24 |

JOHN F. COUCH, *Primary Examiner.*

G. GOLDBERG, *Assistant Examiner.*